United States Patent
Maruyama et al.

(10) Patent No.: US 11,919,995 B2
(45) Date of Patent: Mar. 5, 2024

(54) EPOXY RESIN, EPOXY RESIN COMPOSITION, EPOXY RESIN CURED PRODUCT, AND COMPOSITE MATERIAL

(71) Applicant: RESONAC CORPORATION, Tokyo (JP)

(72) Inventors: Naoki Maruyama, Tokyo (JP); Tomoko Higashiuchi, Tokyo (JP); Kazumasa Fukuda, Tokyo (JP); Hideyuki Katagi, Tokyo (JP); Yuki Nakamura, Tokyo (JP); Yoshitaka Takezawa, Tokyo (JP)

(73) Assignee: RESONAC CORPORATION, Tokyo (JP)

( * ) Notice: Subject to any disclaimer, the term of this patent is extended or adjusted under 35 U.S.C. 154(b) by 62 days.

(21) Appl. No.: 16/970,955

(22) PCT Filed: Feb. 18, 2019

(86) PCT No.: PCT/JP2019/005881
§ 371 (c)(1),
(2) Date: Aug. 19, 2020

(87) PCT Pub. No.: WO2019/160143
PCT Pub. Date: Aug. 22, 2019

(65) Prior Publication Data
US 2020/0392282 A1   Dec. 17, 2020

(30) Foreign Application Priority Data
Feb. 19, 2018  (JP) .................. 2018-026891

(51) Int. Cl.
*C08G 59/24*   (2006.01)
*C08G 59/28*   (2006.01)
*C08G 59/30*   (2006.01)
*C08G 59/50*   (2006.01)
*C08K 3/04*    (2006.01)
*C08L 63/00*   (2006.01)
*B32B 27/38*   (2006.01)
*C08J 5/24*    (2006.01)

(52) U.S. Cl.
CPC ....... *C08G 59/245* (2013.01); *C08G 59/5033* (2013.01); *C08K 3/04* (2013.01)

(58) Field of Classification Search
CPC .... C08G 59/226; C08G 59/24; C08G 59/245; C08G 59/28; C08G 59/5033; C08J 5/24; B32B 27/38; C08L 63/00
USPC ................. 523/427, 428; 428/297.4, 413
See application file for complete search history.

(56) References Cited

U.S. PATENT DOCUMENTS

| | | | |
|---|---|---|---|
| 10,920,010 B2* | 2/2021 | Maruyama | C08G 59/20 |
| 11,015,020 B2* | 5/2021 | Higashiuchi | C08G 59/245 |
| 2019/0338068 A1* | 11/2019 | Maruyama | C08G 59/504 |
| 2020/0199287 A1* | 6/2020 | Higashiuchi | C08G 59/245 |

FOREIGN PATENT DOCUMENTS

| | | |
|---|---|---|
| JP | 2016-113540 A | 6/2016 |
| WO | 2016/104772 A1 | 6/2016 |
| WO | 2018/070051 A1 | 4/2018 |
| WO | 2018/070052 A1 | 4/2018 |
| WO | 2018/070053 A1 | 4/2018 |
| WO | 2018/070534 A1 | 4/2018 |
| WO | 2018/070535 A1 | 4/2018 |
| WO | 2018/168556 A1 | 9/2018 |

* cited by examiner

*Primary Examiner* — Michael J Feely
(74) *Attorney, Agent, or Firm* — SOLARIS Intellectual Property Group, PLLC

(57) ABSTRACT

An epoxy resin, comprising an epoxy compound having two or more mesogenic structures, and having a loss tangent of 1 or more at 35° C. before curing.

14 Claims, No Drawings

EPOXY RESIN, EPOXY RESIN COMPOSITION, EPOXY RESIN CURED PRODUCT, AND COMPOSITE MATERIAL

TECHNICAL FIELD

The invention relates to an epoxy resin, an epoxy resin composition, an epoxy resin cured product, and a composite material.

BACKGROUND ART

Epoxy resin, which is known as a highly heat-resistant resin, is used in various applications. Recently, research has been conducted regarding an epoxy resin that exhibits excellent heat conductivity, with a view to an increase in the operation temperature of power devices, in which epoxy resin is used.

A cured product of an epoxy resin, including an epoxy compound having a mesogenic structure in the molecule (hereinafter, also referred to as a mesogen-containing epoxy resin), is known to exhibit excellent heat conductivity and fracture toughness. However, a mesogen-containing epoxy resin generally has a high viscosity as compared with other epoxy resins, and may have insufficient fluidity during processing.

One method for improving the fluidity of a mesogen-containing epoxy resin is to add a solvent to lower the viscosity. In such cases, however, voids due to the solvent may be produced during the curing of the mesogen-containing epoxy resin, thereby affecting the product quality. Therefore, a method of obtaining an epoxy resin having a molecular weight of a specific range, by causing an epoxy monomer having a mesogenic structure to react with a divalent phenol compound, has been proposed (see, for example, Patent Documents 1 and 2).

PRIOR ART DOCUMENTS

Patent Documents

[Patent Document 1] International Publication No. WO 2016-104772
[Patent Document 2] Japanese Patent Application-Laid Open No. 2016-113540

SUMMARY OF THE INVENTION

Problem to be Solved by the Invention

Although the mesogen-containing epoxy resin described in Patent Document 1 has a lowered softening point, it may not be able to form a uniform coating owing to its high viscosity under the temperature conditions during processing. Similarly, although the mesogen-containing epoxy resin described in Patent Document 2 has a lowered softening point, it may not be able to form a uniform coating owing to its high viscosity under the temperature conditions during processing, or may not be able to achieve sufficient adhesion between resin sheets obtained from the epoxy resin.

In view of the foregoing, the invention aims to provide an epoxy resin and an epoxy resin composition, having excellent handelability and adhesion before curing, and excellent toughness as a cured product. The invention also aims to provide an epoxy resin cured product and a composite material obtained by using the epoxy resin or the epoxy resin composition.

Means for Solving the Problem

The means for solving the problem include the following embodiments.

<1> An epoxy resin, comprising an epoxy compound having two or more mesogenic structures, and having a loss tangent of 1 or more at 35° C. before curing.

<2> The epoxy resin according to <1>, wherein the epoxy compound has a mesogenic structure represented by the following Formula (1):

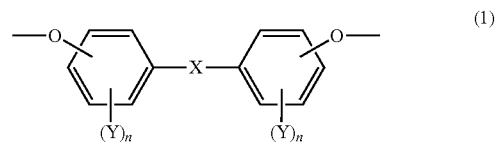

wherein, in Formula (1), X represents a single bond or a linking group that includes at least one divalent group selected from the following Group (A); each Y independently represents an aliphatic hydrocarbon group having 1 to 8 carbon atoms, an alkoxy group having 1 to 8 carbon atoms, a fluorine atom, a chlorine atom, a bromine atom, an iodine atom, a cyano group, a nitro group or an acetyl group; and each n independently represents an integer from 0 to 4:

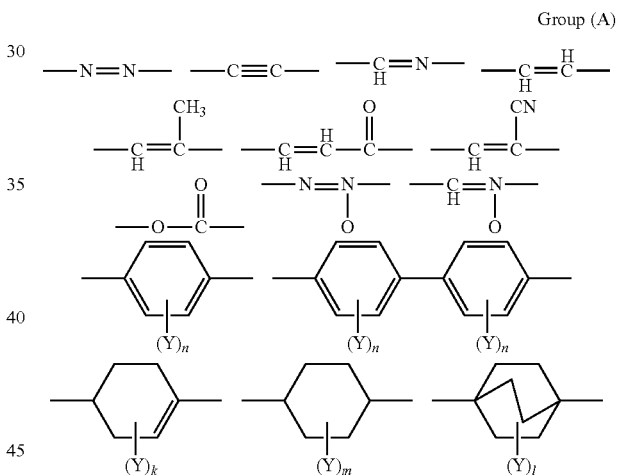

Group (A)

wherein, in Group (A), each Y independently represents an aliphatic hydrocarbon group having 1 to 8 carbon atoms, an alkoxy group having 1 to 8 carbon atoms, a fluorine atom, a chlorine atom, a bromine atom, an iodine atom, a cyano group, a nitro group or an acetyl group; k represents an integer from 0 to 7; l represents an integer from 0 to 12; m represents an integer from 0 to 8; and each n independently represents an integer from 0 to 4.

<3> The epoxy resin according to <2>, wherein the mesogenic structure represented by Formula (1) is a structure represented by the following Formula (2):

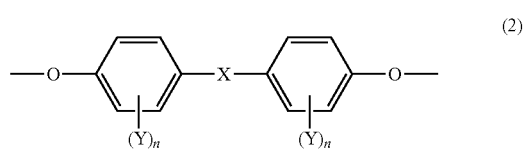

wherein, in Formula (2), X represents a single bond or a linking group that includes at least one divalent group selected from Group (A); each Y independently represents an aliphatic hydrocarbon group having 1 to 8 carbon atoms, an alkoxy group having 1 to 8 carbon atoms, a fluorine atom, a chlorine atom, a bromine atom, an iodine atom, a cyano group, a nitro group or an acetyl group; and each n independently represents an integer from 0 to 4.

<4> The epoxy resin according to <2> or <3>, wherein the epoxy compound has a structure represented by the following Formula (1-A) or Formula (1-B):

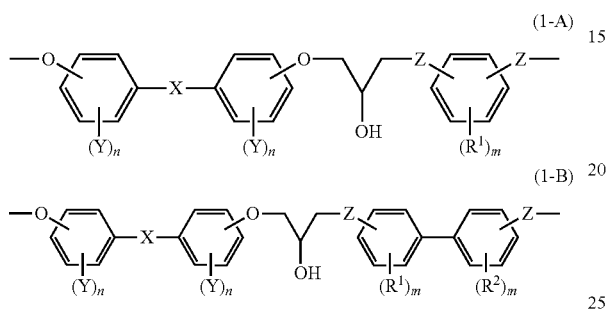

wherein, in Formula (1-A) and Formula (1-B), each of $R^1$ and $R^2$ independently represents an alkyl group having 1 to 8 carbon atoms; X represents a single bond or a linking group that includes at least one divalent group selected from Group (A); each Y independently represents an aliphatic hydrocarbon group having 1 to 8 carbon atoms, an alkoxy group having 1 to 8 carbon atoms, a fluorine atom, a chlorine atom, a bromine atom, an iodine atom, a cyano group, a nitro group or an acetyl group; each Z independently represents —O— or —NH—; each m independently represents an integer from 0 to 4; and each n independently represents an integer from 0 to 4.

<5> The epoxy resin according to any one of <2> to <4>, wherein the epoxy compound has a structure represented by the following Formula (2-A) or the following Formula (2-B):

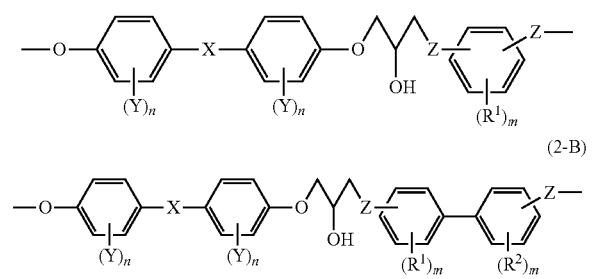

wherein, in Formula (2-A) and Formula (2-B), each X represents a single bond or a linking group that includes at least one divalent group selected from Group (A); each Y independently represents an aliphatic hydrocarbon group having 1 to 8 carbon atoms, an alkoxy group having 1 to 8 carbon atoms, a fluorine atom, a chlorine atom, a bromine atom, an iodine atom, a cyano group, a nitro group or an acetyl group; each n independently represents an integer from 0 to 4; each Z independently represents —O— or —NH—; each of $R^1$ and $R^2$ independently represents an alkyl group having 1 to 8 carbon atoms; and each m independently represents an integer from 0 to 4.

<6> The epoxy resin according to any one of <1> to <5>, wherein at least one of the two or more mesogenic structures has a structure represented by at least one of Formula (3) or Formula (4):

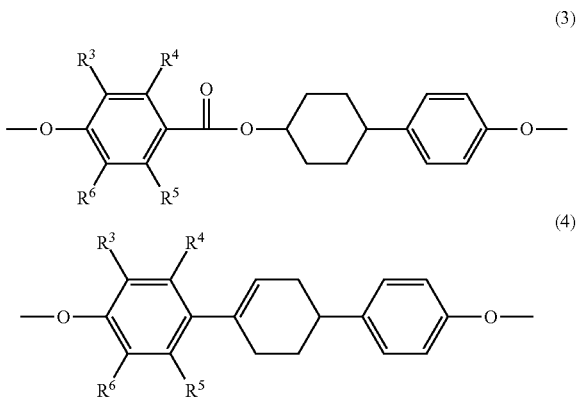

wherein, in Formula (3) and Formula (4), each of $R^3$ to $R^6$ independently represents a hydrogen atom or an alkyl group having 1 to 3 carbon atoms.

<7> The epoxy resin according to any one of <1> to <6>, wherein the epoxy compound has two mesogenic structures and a divalent aromatic group that is disposed between the two mesogenic structures.

<8> The epoxy resin according to <7>, wherein the divalent aromatic group is a phenylene group or a divalent biphenyl group.

<9> The epoxy resin according to any one of <1> to <8>, comprising a mesogenic epoxy monomer represented by the following Formula (1-m):

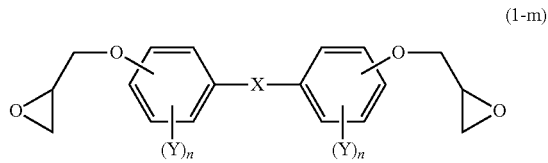

wherein, in Formula (1-m), X represents a single bond or a linking group that includes at least one divalent group selected from the following Group (A); each Y independently represents an aliphatic hydrocarbon group having 1 to 8 carbon atoms, an alkoxy group having 1 to 8 carbon atoms, a fluorine atom, a chlorine atom, a bromine atom, an iodine atom, a cyano group, a nitro group or an acetyl group: and each n independently represents an integer from 0 to 4:

Group (A)

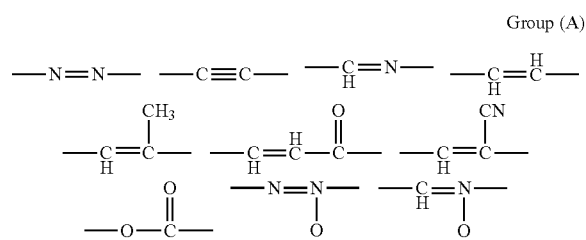

-continued

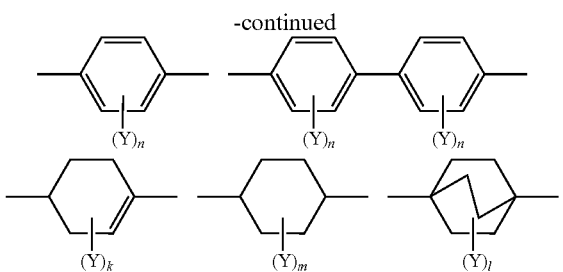

wherein, in Group (A), each Y independently represents an aliphatic hydrocarbon group having 1 to 8 carbon atoms, an alkoxy group having 1 to 8 carbon atoms, a fluorine atom, a chlorine atom, a bromine atom, an iodine atom, a cyano group, a nitro group or an acetyl group; k represents an integer from 0 to 7; l represents an integer from 0 to 12; m represents an integer from 0 to 8; and each n independently represents an integer from 0 to 4.

<10> The epoxy resin according to <9>, wherein the mesogenic epoxy monomer comprises an epoxy compound represented by the following Formula (2-m):

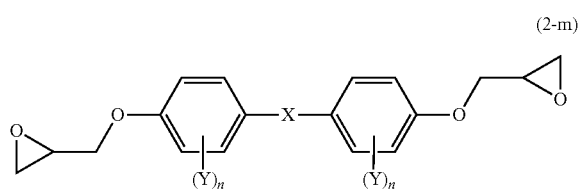

(2-m)

wherein, in Formula (2-m), X represents a single bond or a linking group that includes at least one divalent group selected from the following Group (A); each Y independently represents an aliphatic hydrocarbon group having 1 to 8 carbon atoms, an alkoxy group having 1 to 8 carbon atoms, a fluorine atom, a chlorine atom, a bromine atom, an iodine atom, a cyano group, a nitro group or an acetyl group; and each n independently represents an integer from 0 to 4.

<11> The epoxy resin according to <9> or <10>, wherein the mesogenic epoxy monomer comprises an epoxy compound represented by the following Formula (3-m) or Formula (4-m):

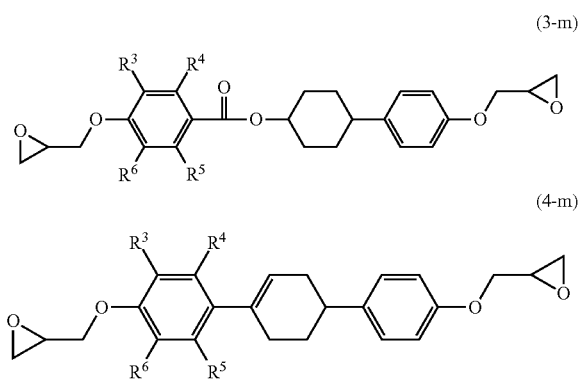

(3-m)

(4-m)

wherein, in Formula (3-m) and Formula (4-m), each of $R^3$ to $R^6$ independently represents a hydrogen atom or an alkyl group having 1 to 3 carbon atoms.

<12> The epoxy resin according to any one of <9> to <11>, wherein a content of the mesogenic epoxy monomer is not greater than 50% of the total epoxy resin.

<13> An epoxy resin composition, comprising the epoxy resin according to any one of <1> to <12> and a curing agent.

<14> The epoxy resin composition according to <13>, wherein the curing agent comprises a compound having two or more amino groups that are directly bonded to an aromatic ring.

<15> The epoxy resin composition according to <13> or <14>, wherein the curing agent comprises 3,3'-diaminodiphenylsulfone.

<16> An epoxy resin cured product, which is obtained by curing the epoxy resin composition according to any one of <13> to <15>.

<17> A composite material, comprising the epoxy resin cured product according to <16> and a reinforcing material.

<18> The composite material according to <17>, wherein the reinforcing material comprises a carbon material.

Effect of the Invention

According to the invention, an epoxy resin and an epoxy resin composition, having excellent handelability and adhesion before curing, and excellent toughness as a cured product are provided. Further, an epoxy resin cured product and a composite material obtained by using the epoxy resin or the epoxy resin composition are provided.

Means for Implementing the Invention

In the following, details of the embodiments are described. However, the invention is not limited to these embodiments. In the embodiments, the elements (including elementary steps) thereof are not essential unless otherwise specified. Also, the numbers and numerical ranges do not limit the invention.

In the disclosure, the numerical range represented by "A to B" includes A and B as a minimum value and a maximum value, respectively.

In the disclosure, when numerical ranges are described in a stepwise manner, the values of the upper or lower limit of each numerical range may be substituted by the values of the upper or lower limit of the other numerical range, or may be substituted by the values described in the Examples.

In the disclosure, when there are more than one kind of substance corresponding to a component of a composition, the content of the component refers to a total content of the substances, unless otherwise stated.

In the disclosure, the epoxy compound refers to a compound having an epoxy group in its molecule. The epoxy resin refers to a collective concept of epoxy compounds that are not in a cured state.

<Epoxy Resin>

The epoxy resin according to the disclosure is an epoxy resin, comprising an epoxy compound having two or more mesogenic structures, and having a loss tangent of 1 or more at 35° C. before curing.

The epoxy resin as described above exhibits a superior toughness, owing to an epoxy compound having a mesogenic structure included therein. In addition, by including an epoxy compound having two or more mesogenic structures (hereinafter, also referred to as a specific epoxy compound), the epoxy resin has low viscosity and excellent handleability, as compared with an epoxy resin that does not include a specific epoxy compound. Further, since the epoxy resin has a loss tangent (tan δ) of 1 or more at 35° C. before curing, the epoxy resin exhibits excellent adhesion.

The loss tangent of the epoxy resin is a value represented by "loss elastic modulus (viscous term)/storage elastic modulus (elastic term)". The greater the loss tangent of the epoxy resin is, the greater the viscous property of the epoxy resin is. For example, it is known that when two resin sheets, including an epoxy resin with a significant viscous property, are laminated, the resin sheets are tightly attached by wetting at an interface thereof. Therefore, it is possible to produce a laminate in which resin sheets are tightly attached, by using a resin sheet including the epoxy resin as described above.

From the viewpoint of adhesion, the loss tangent of the epoxy resin at 35° C. before curing is 1 or more, preferably 2 or more, more preferably 5 or more. The upper limit of the loss tangent of the epoxy resin at 35° C. before curing is not particularly limited. For example, the loss tangent of the epoxy resin at 35° C. before curing may be 100 or less.

The loss tangent of the epoxy resin at 35° C. before curing may be measured by a method as described in the Examples, for example.

The value of the loss tangent of the epoxy resin at 35° C. before curing may be controlled by, for example, the molecular structure or the content of the specific epoxy compound included in the epoxy resin.

(Specific Epoxy Compound)

The structure of the specific epoxy compound is not particularly limited as long as it has two or more mesogenic structures. The two or more mesogenic structures in one molecule of the specific epoxy compound may be the same or different from each other.

The mesogenic structure refers to a structure of an epoxy compound, wherein the epoxy compound is included in an epoxy resin that has an ability of exhibiting liquid crystallinity in a cured state.

Examples of the mesogenic structure of the specific epoxy compound include a biphenyl structure, a phenyl benzoate structure, a cyclohexyl benzoate structure, an azobenzene structure, a stilbene structure, a terphenyl structure, an anthracene structure, derivatives of these structures, and a structure in which two or more of these structures are linked via a linking group.

An epoxy resin including an epoxy compound having a mesogenic structure forms, in a cured product, a higher-order structure. In the disclosure, the higher-order structure refers to a structure in which structural elements are arranged to form a micro-and-organized structure. Examples of the higher-order structure include a crystalline phase and a liquid crystalline phase, and existence thereof can be determined with a polarizing microscope. Specifically, existence of a higher-order structure can be determined by whether or not an interference pattern due to depolarization is observed under crossed Nicols. A higher-order structure generally exists in a cured product of an epoxy resin composition and forms a domain structure in the form of an island, wherein each island corresponds to a higher-order structure. The structural elements of the higher-order structure are generally formed by covalent bonding.

Examples of a higher-order structure formed in a cured product include a nematic structure and a smectic structure, which are a liquid crystal structure, respectively. The nematic structure is a liquid crystal structure that has only an orientational order in which molecules are arranged in one direction. The smectic structure is a liquid crystal structure that has a one-dimensional order in addition to an orientational order, and forms a lamellar structure. The degree of order is higher in a smectic structure than in a nematic structure. Therefore, a smectic structure is preferred in terms of thermal conductivity and fracture toughness of a cured product.

It is also possible to determine whether or not a smectic structure is formed in a cured product of the epoxy resin by X-ray diffraction measurement. The X-ray diffraction measurement may be performed by a method described in the Examples, for example.

The mesogenic structure of the specific epoxy compound may be a structure represented by the following Formula (1).

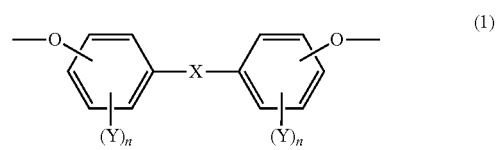

In Formula (1), X represents a single bond or a linking group that includes at least one divalent group selected from the following Group (A). Each Y independently represents an aliphatic hydrocarbon group having 1 to 8 carbon atoms, an alkoxy group having 1 to 8 carbon atoms, a fluorine atom, a chlorine atom, a bromine atom, an iodine atom, a cyano group, a nitro group or an acetyl group; and each n independently represents an integer from 0 to 4.

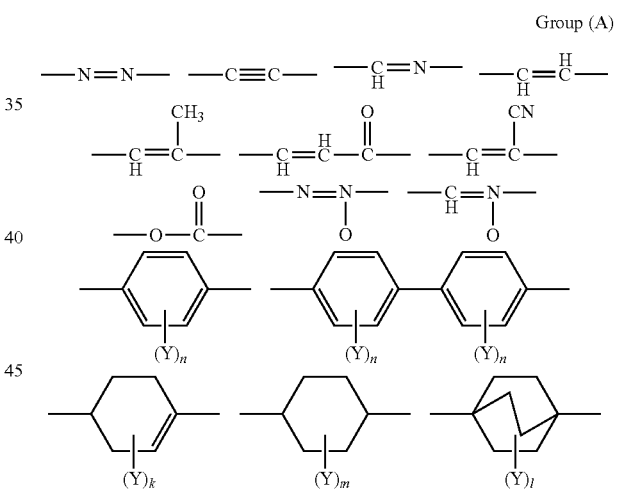

In Group (A), each Y independently represents an aliphatic hydrocarbon group having 1 to 8 carbon atoms, an alkoxy group having 1 to 8 carbon atoms, a fluorine atom, a chlorine atom, a bromine atom, an iodine atom, a cyano group, a nitro group or an acetyl group; each n independently represents an integer from 0 to 4; k represents an integer from 0 to 7; m represents an integer from 0 to 8; and l represents an integer from 0 to 12.

In the mesogenic structure represented by Formula (1), when X is at least one linking group selected from the divalent groups in Group (A), X is preferably at least one linking group selected from the divalent groups included in the following Group (Aa); more preferably a linking group that is selected from the divalent groups included in the following Group (Aa) and has a ring structure.

Group (Aa)

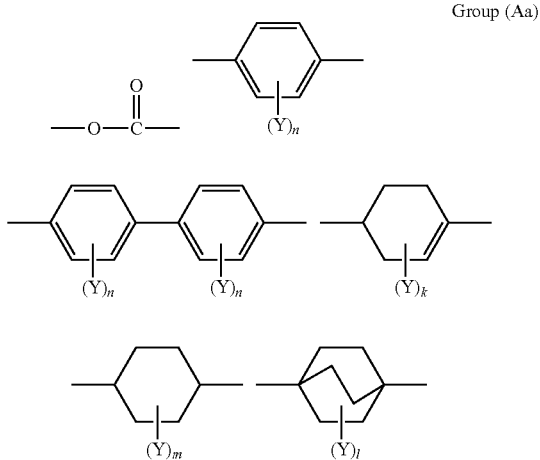

In Group (Aa), each Y independently represents an aliphatic hydrocarbon group having 1 to 8 carbon atoms, an alkoxy group having 1 to 8 carbon atoms, a fluorine atom, a chlorine atom, a bromine atom, an iodine atom, a cyano group, a nitro group or an acetyl group; each n independently represents an integer from 0 to 4; k represents an integer from 0 to 7; m represents an integer from 0 to 8; and l represents an integer from 0 to 12.

It is preferred that at least one of the mesogenic structures, included in the specific epoxy compound, is a mesogenic structure represented by the following Formula (2); and it is more preferred that all of mesogenic structures, included in the specific epoxy compound, are a mesogenic structure represented by the following Formula (2).

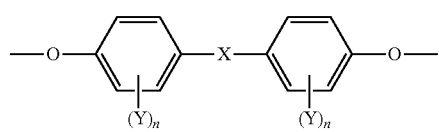
(2)

In Formula (2), definitions and preferred examples of X, Y and n are the same as the definitions and preferred examples of X, Y and n in Formula (1).

It is preferred that at least one of the mesogenic structures, included in the specific epoxy compound, is a mesogenic structure represented by the following Formula (3) or Formula (4); and it is more preferred that all of the mesogenic structures, included in the specific epoxy compound, are a mesogenic structure represented by the following Formula (3) or Formula (4).

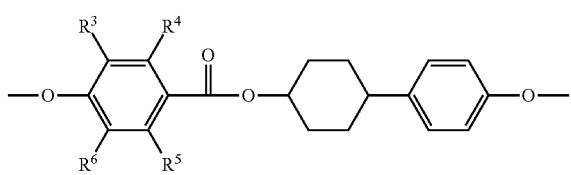
(3)

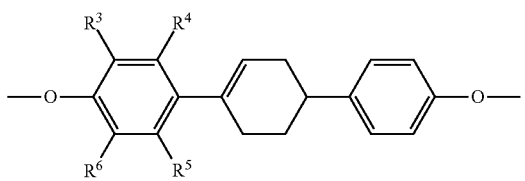
(4)

In Formula (3) or Formula (4), each of $R^3$ to $R^6$ independently represents a hydrogen atom or an alkyl group having 1 to 3 carbon atoms.

Each of $R^3$ to $R^6$ is preferably independently a hydrogen atom or an alkyl group having 1 or 2 carbon atoms, more preferably a hydrogen atom or a methyl group, further preferably a hydrogen atom. The number of hydrogen atoms represented by $R^3$ to $R^6$ is preferably 2 to 4, more preferably 3 or 4, further preferably 4. When any one of $R^3$ to $R^6$ is an alkyl group having 1 to 3 carbon atoms, at least one of $R^3$ or $R^6$ is preferably an alkyl group having 1 to 3 carbon atoms.

From the viewpoint of handleability before curing and adhesion, the specific epoxy compound preferably has a divalent aromatic group that is disposed between two of the mesogenic structures. In that case, the divalent aromatic group and the two mesogenic structures may be bonded directly or via a linking group.

In the disclosure, when the specific epoxy compound has a mesogenic structure including a divalent aromatic group, the divalent aromatic group between the two mesogenic structures is not regarded as the divalent aromatic group included in the mesogenic structure.

Examples of the divalent aromatic group disposed between the two mesogenic structures include a phenylene group or a divalent biphenyl group. Examples of the phenylene group include a structure represented by the following Formula (5A), and examples of the divalent biphenyl group include a structure represented by the following Formula (5B).

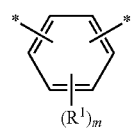
(5A)

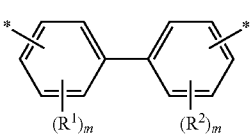
(5B)

In Formula (5A) and Formula (5B), * represents a bonding site to an adjacent atom. Examples of the adjacent atom include an oxygen atom and a nitrogen atom. Each of $R^1$ and $R^2$ independently represents a monovalent alkyl group having 1 to 8 carbon atoms. Each m independently is an integer from 0 to 4.

Each of $R^1$ and $R^2$ is preferably independently an alkyl group having 1 to 3 carbon atoms, more preferably a methyl group.

Each m is preferably independently an integer from 0 to 2, more preferably 0 or 1, further preferably 0.

Among the structures represented by Formula (5A), a structure represented by the following Formula (5a) is preferred, and among the structures represented by Formula (5B), a structure represented by the following Formula (5b) is preferred. An epoxy compound having a structure represented by Formula (5a) or Formula (5b) tends to have a linear molecular structure, and therefore, it is considered to have a high degree of molecular stacking property and easier to form a higher-order structure.

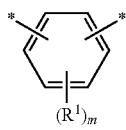

(5a)

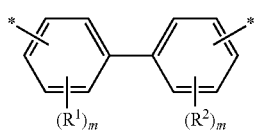

(5b)

In Formulae (5a) and (5b), definitions and preferred examples of *, $R^1$, $R^2$ and m are the same as the definitions and preferred examples of *, $R^1$, $R^2$ and m in Formulae (5A) and (5B).

The specific epoxy compound may be an epoxy compound having a structure represented by the following Formula (1-A) or Formula (1-B).

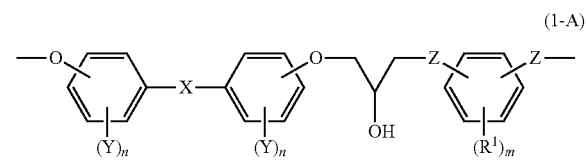

(1-A)

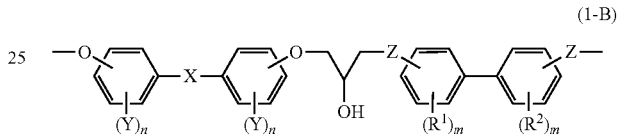

(1-B)

In Formulae (1-A) and (1-B), definitions and preferred examples of X, Y and n are the same as the definitions and preferred examples of X, Y and n in Formula (1). Definitions and preferred examples of $R^1$, $R^2$ and m are the same as the definitions and preferred examples of $R^1$, $R^2$ and m in Formulae (5A) and (5B). Each Z independently represents —O— or —NH—.

From the viewpoint of forming a higher-order structure, the epoxy compound having a structure represented by Formula (1-A) is preferably an epoxy compound having a structure represented by Formula (2-A), and the epoxy compound having a structure represented by Formula (1-B) is preferably an epoxy compound having a structure represented by Formula (2-B).

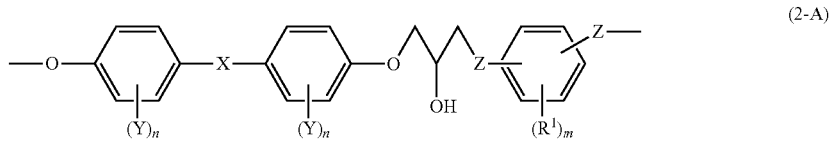

(2-A)

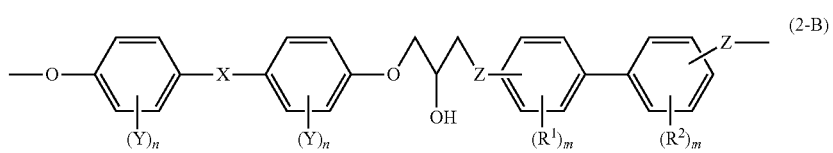

(2-B)

In Formulae (2-A) and (2-B), definitions and preferred examples of X, Y, n, m, $R^1$, $R^2$ and Z are the same as the definitions and preferred examples of X, Y, n, m, $R^1$, $R^2$ and Z in Formulae (1-A) and (1-B).

Examples of the epoxy compound having a structure represented by Formula (1-A) include an epoxy compound having a structure selected from the group consisting of the following Formulae (3-A-1) to (3-A-4).

Examples of the epoxy compound having a structure represented by Formula (1-B) include an epoxy compound having a structure selected from the group consisting of the following Formulae (3-B-1) and (3-B-4).

In Formulae (3-A-1) to (3-A-4) and (3-B-1) to (3-B-4), definitions and preferred examples of $R^1$, $R^2$, m and Z are the same as the definitions and preferred examples of $R^1$, $R^2$, m and Z in Formulae (1-A) and (1-B). Definitions and preferred examples of $R^3$ to $R^6$ are the same as the definitions and preferred examples of $R^3$ to $R^6$ in Formulae (3) and (4).

From the viewpoint of handleability and adhesion, the specific epoxy compound is preferably a compound having two mesogenic structures (hereinafter, also referred to a dimer compound), more preferably a compound having a structure in which a divalent aromatic group (preferably a phenyelene group or a divalent biphenyl group) is disposed between the two mesogenic structures.

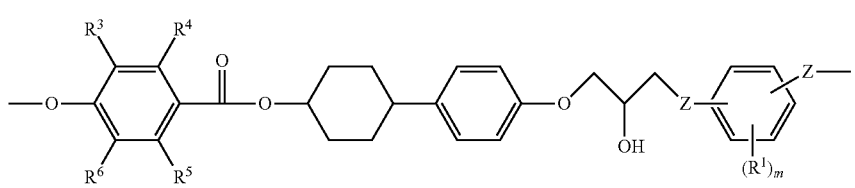
(3-A-1)

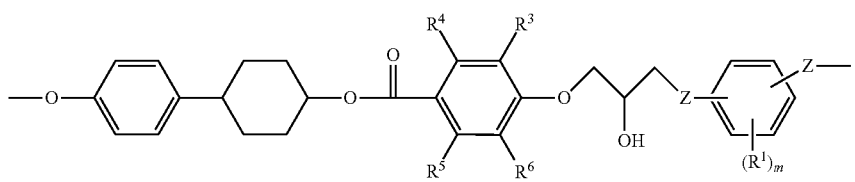
(3-A-2)

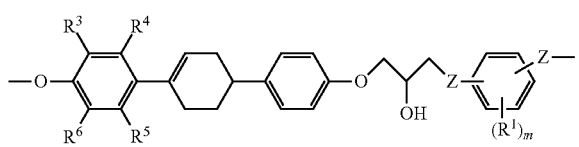
(3-A-3)

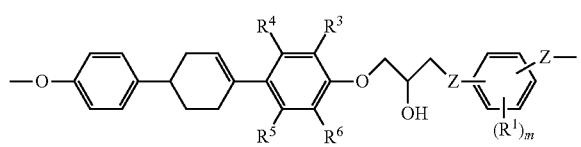
(3-A-4)

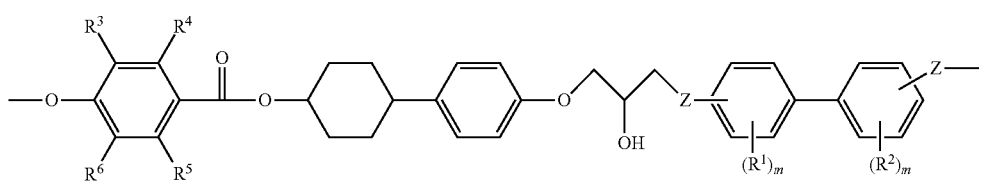
(3-B-1)

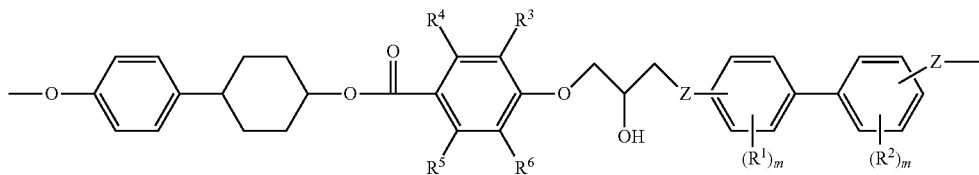
(3-B-2)

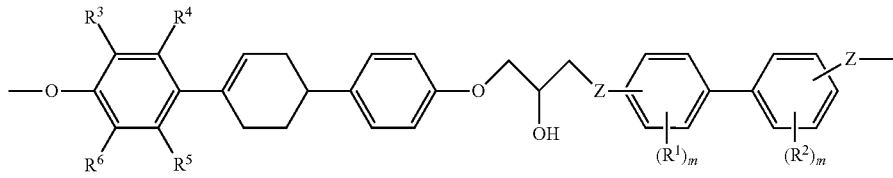
(3-B-3)

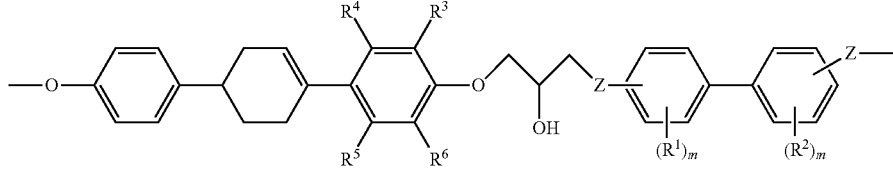
(3-B-4)

Examples of the specific epoxy compound as a dimer compound include a compound represented by the following Formula (4-A-1) or (4-B-1).

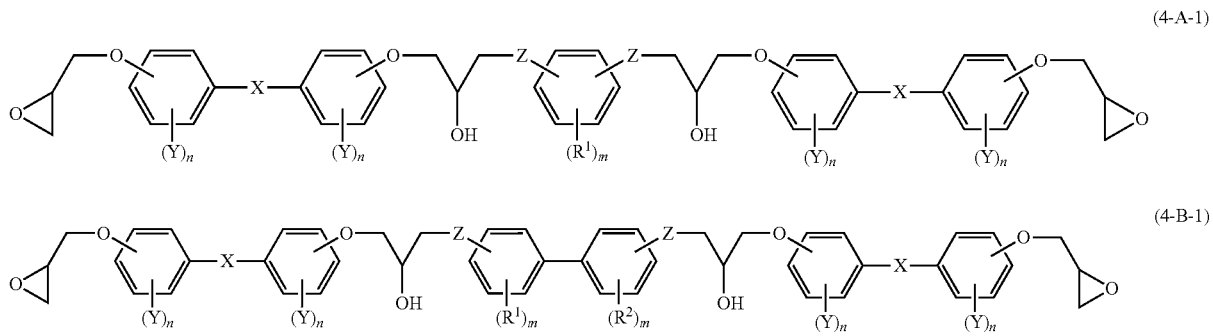

(4-A-1)

(4-B-1)

In Formulae (4-A-1) and (4-B-1), definitions and preferred examples of X, Y, n, m, $R^1$, $R^2$ and Z are the same as the definitions and preferred examples of X, Y, n, m, $R^1$, $R^2$ and Z in Formulae (1-A) and (1-B).

From the viewpoint of forming a higher-order structure, the epoxy compound having a structure represented by Formula (4-A-1) is preferably an epoxy compound having a structure represented by the following Formula (5-A-1), and the epoxy compound having a structure represented by Formula (4-B-1) is preferably an epoxy compound having a structure represented by the following Formula (5-B-1).

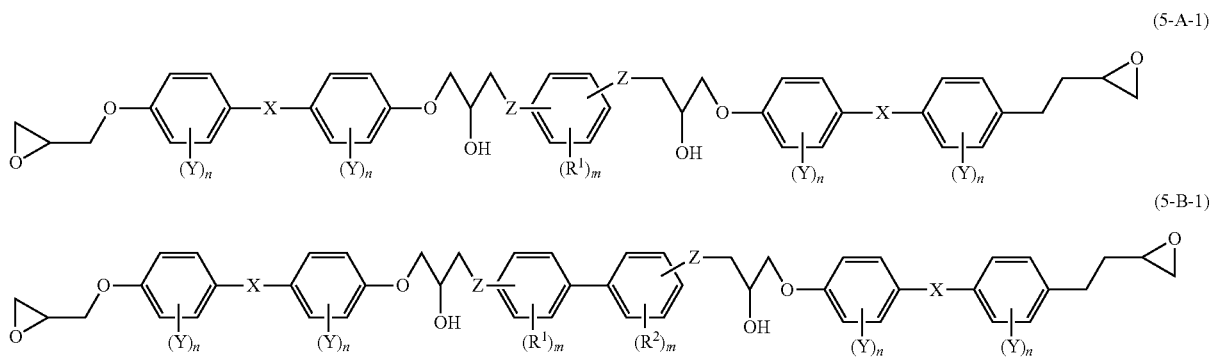

(5-A-1)

(5-B-1)

In Formulae (5-A-1) and (5-B-1), definitions and preferred examples of X, Y, n, m, $R^1$, $R^2$ and Z are the same as the definitions and preferred examples of X, Y, n, m, $R^1$, $R^2$ and Z in Formulae (4-A-1) and (4-B-1).

Specific examples of the epoxy compound having a structure represented by Formula (4-A-1) include an epoxy compound having a structure represented by the following Formulae (6-A-1) to (6-A-6).

Specific examples of the epoxy compound having a structure represented by Formula (4-B-1) include an epoxy compound having a structure represented by the following Formulae (6-B-1) to (6-B-6).

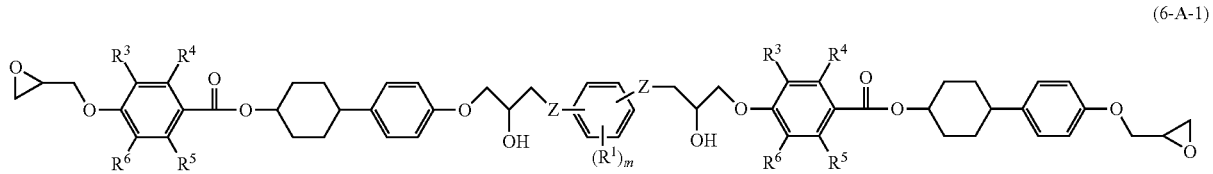

(6-A-1)

-continued
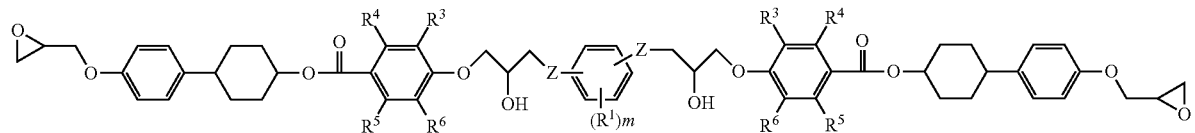
(6-A-2)
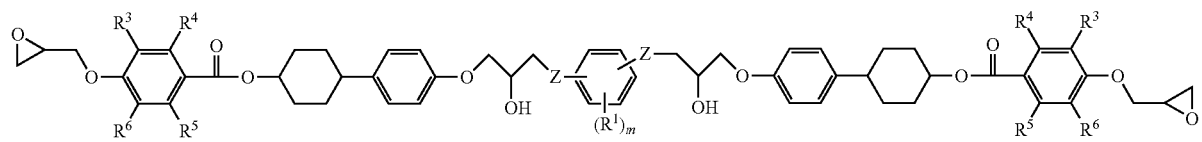
(6-A-3)
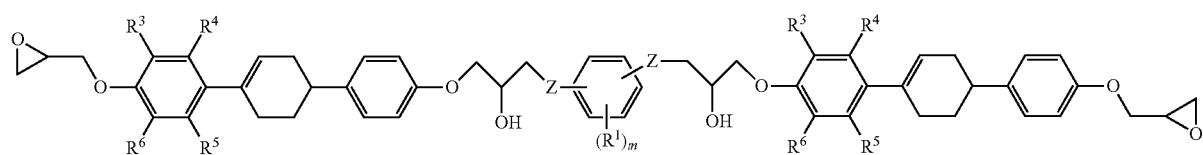
(6-A-4)
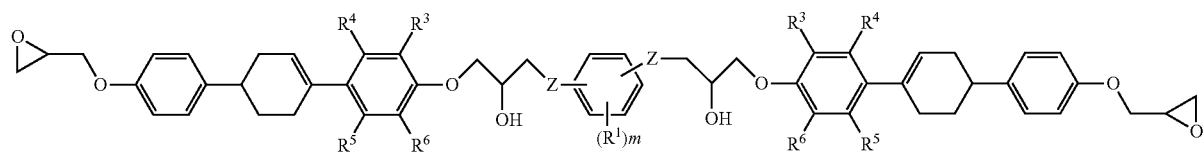
(6-A-5)
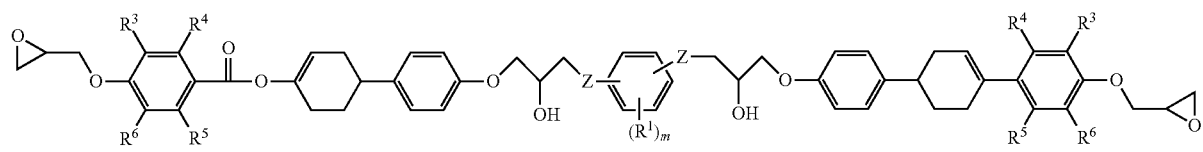
(6-A-6)
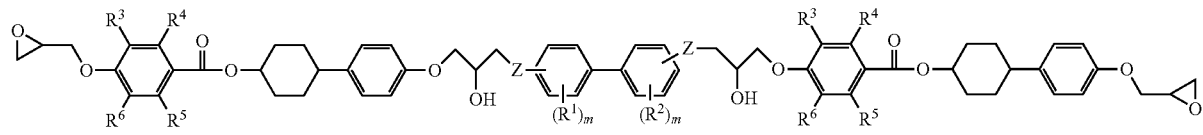
(6-B-1)
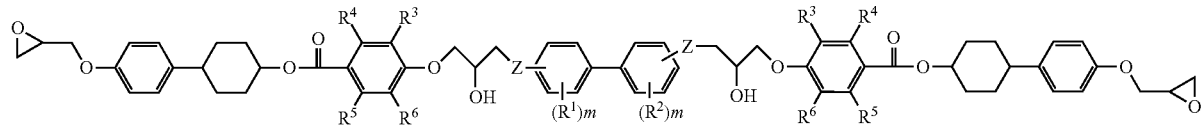
(6-B-2)
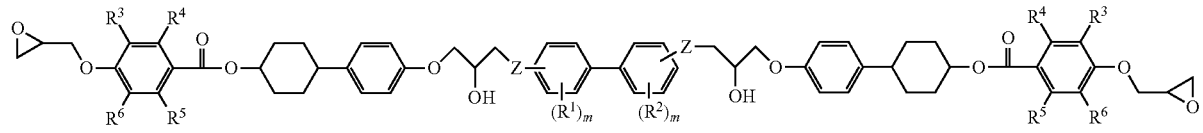
(6-B-3)
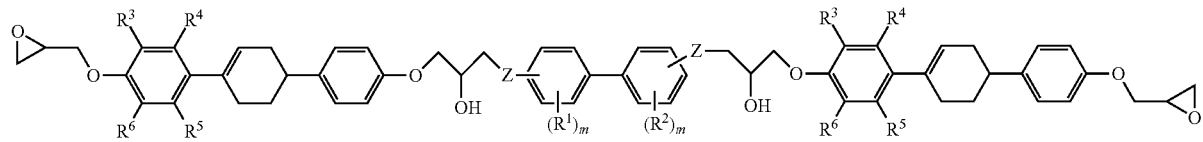
(6-B-4)

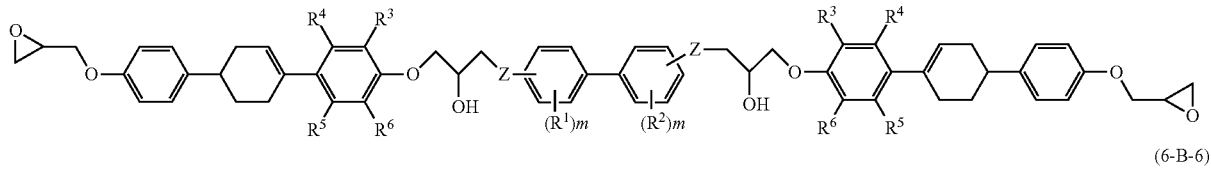

(6-B-5)

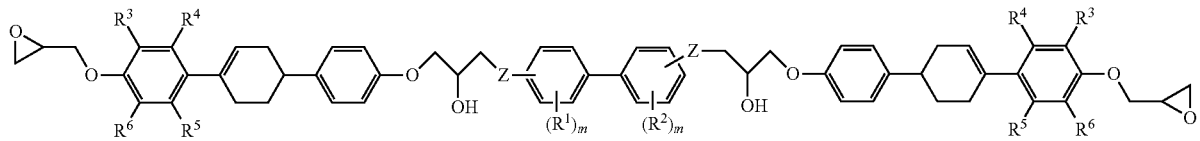

(6-B-6)

In Formulae (6-A-1) to (6-A-6) and Formulae (6-B-1) to (6-B-6), definitions and preferred examples of $R^1$, $R^2$, m and Z are the same as the definitions and preferred examples of $R^1$, $R^2$, m and Z in Formulae (1-A) and (1-B). Definitions and preferred examples of $R^3$ to $R^6$ are the same as the definitions and preferred examples of $R^3$ to $R^6$ in Formulae (3) and (4).

The epoxy resin may include an epoxy compound having a structure represented by the following Formula (1-m), in addition to the specific epoxy compound.

(1-m)

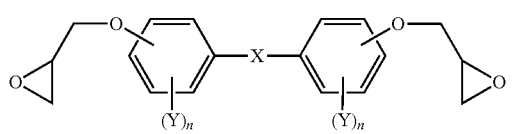

In Formula (1-m), definitions and preferred examples of X, Y and n are the same as the definitions and preferred examples of X, Y and n in Formula (1).

From the viewpoint of forming a higher-order structure in a cured product, the mesogenic epoxy monomer represented by Formula (1-m) is preferably a mesogenic epoxy monomer having a structure represented by the following Formula (2-m).

(2-m)

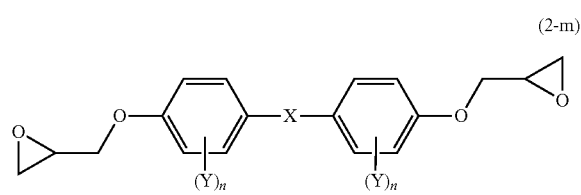

In Formula (2-m), definitions and preferred examples of X, Y and n are the same as the definitions and preferred examples of X, Y and n in Formula (1-m).

The mesogenic epoxy monomer represented by Formula (1-m) is more preferably a mesogenic epoxy monomer having a structure represented by the following Formula (3-m) or Formula (4-m).

(3-m)

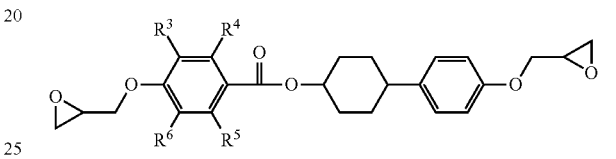

(4-m)

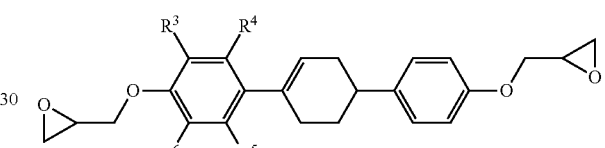

In Formulae (3-m) and (4-m), definitions and preferred examples of $R^3$ to $R^6$ are the same as the definitions and preferred examples of $R^3$ to $R^6$ in Formula (3).

(Method of Synthesis of Specific Epoxy Compound)

The method for synthesizing a specific epoxy compound is not particularly limited. For example, the specific epoxy compound may be obtained by reacting a compound that has one mesogenic structure that is the same as the mesogenic structure of the specific epoxy compound and an epoxy group (hereinafter, also referred to as a mesogenic epoxy monomer) with a compound having a functional group that can react with an epoxy group of the mesogenic epoxy monomer.

The structure of the mesogenic epoxy monomer is not particularly limited, and may be an epoxy compound having a structure represented by Formula (1-m), for example.

The method of reacting a mesogenic epoxy monomer and a compound having a functional group that can react with an epoxy group of the mesogenic epoxy monomer is not specifically limited. Specifically, for example, the reaction can be performed by dissolving a mesogenic epoxy monomer and a compound having a functional group that can react with an epoxy group of the mesogenic epoxy monomer, and optionally a reaction catalyst, in a solvent, and stirring the same while heating.

Alternatively, for example, the specific epoxy compound may be synthesized by mixing a mesogenic epoxy monomer and a compound having a functional group that can react with an epoxy group of the mesogenic epoxy monomer, without using a reaction catalyst or a solvent, and stirring the mixture while heating.

The solvent used for the synthesis is not particularly limited, as long as it can dissolve a mesogenic epoxy monomer and a compound having a functional group that can react with an epoxy group of the mesogenic epoxy monomer, and can be heated to a temperature required to cause reaction of the compounds. Specific examples of the solvent include cyclohexanone, cyclopentanone, ethyl lactate, propyleneglycol monomethyl ether, N-methyl pyrrolidone, methyl cellosolve, ethyl cellosolve, and propyleneglycol monopropyl ether.

The amount of the solvent is not particularly limited, as long as a mesogenic epoxy monomer and a compound having a functional group that is capable of reacting with an epoxy group of the mesogenic epoxy monomer, and optionally a reaction catalyst, can be dissolved at a reaction temperature. Although the degree of solubility depends on the type of the raw materials, the solvent and the like, the viscosity of the solvent after the reaction tends to be in a preferred range when the solvent is used in an amount that adjusts an initial solid content concentration to be from 20% by mass to 60% by mass, for example.

The compound having a functional group that can react with an epoxy group of the mesogenic epoxy monomer is not particularly limited. From the viewpoint of heat resistance, a compound having at least one benzene ring (aromatic compound) is preferred. From the viewpoint of forming a smectic structure in a cured product, the compound is preferably at least one selected from the group consisting of a dihydroxybenzene compound, having a structure in which two hydroxy groups are bonded to a benzene ring; a diaminobenzene compound, having a structure in which two amino groups are bonded to a benzene ring; a dihydroxybiphenyl compound, having a structure in which two hydroxy groups are bonded to each of the benzene rings that form a biphenyl structure, respectively; and a diaminobiphenyl compound, having a structure in which two amino groups are bonded to each of the benzene rings that form a biphenyl structure, respectively. Hereinafter, these compounds are also referred to as specific aromatic compounds.

Examples of the dihydroxy compound include catechol, resorcinol, hydroquinone and derivatives thereof.

Examples of the diaminobenzene compound include 1,2-diaminobenzene, 1,3-diaminobenzene, 1,4-diaminobenzene and derivatives thereof Examples of the dihydroxybiphenyl compound include 2,2'-dihydroxybiphenyl, 2,3'-dihydroxybiphenyl, 2,4'-dihydroxybiphenyl, 3,3'-dihydroxybiphenyl, 3,4'-dihydroxybiphenyl, 4,4'-dihydroxybiphenyl and derivatives thereof.

Examples of the diaminobiphenyl compound include 2,2'-diaminobiphenyl, 2,3'-diaminoibiphenyl, 2,4'-diaminobiphenyl, 3,3'-diaminobiphenyl, 3,4'-diaminobiphenyl, 4,4'-diaminobiphenyl and derivatives thereof.

Derivatives of the specific aromatic compound include a specific aromatic compound having a substitute, such as an alkyl group of from 1 to 8 carbon atoms, on the benzene ring.

The specific aromatic compound may be used alone, or in combination of two or more kinds.

The type of the reaction catalyst is not particularly limited, and may be selected based on the reaction rate, reaction temperature, storage stability and the like. Specific examples of the reaction catalyst include an imidazole compound, an organic phosphorous compound, a tertiary amine compound and a quaternary ammonium salt. A single kind of the reaction catalyst may be used alone, or two or more kinds may be used in combination.

From the viewpoint of thermal resistance of a cured product, the reaction catalyst is preferably an organic phosphorous compound.

Preferred examples of the organic phosphorous compound include an organic phosphine compound; a compound having intermolecular polarization obtained by adding, to an organic phosphine compound, a compound having a π bond such as a maleic acid anhydride, a quinone compound, diazodiphenyl methane or a phenol resin; and a complex formed by an organic phosphine compound and an organic boron compound.

Specific examples of the organic phosphine compound include triphenylphosphine, diphenyl(p-tolyl)phosphine, tris(alkylphenyl)phosphine, tris(alkoxyphenyl)phosphine, tris(alkylalkoxyphenyl)phosphine, tris(dialkylphenyl)phosphine, tris(trialkylphenyl)phosphine, tris(tetraalkylphenyl)phosphine, tris(dialkoxyphenyl)phosphine, tris(trialkoxyphenyl)phosphine, tris(tetraalkoxyphenyl)phosphine, trialkylphosphine, dialkylarylphosphine and alkyldiarylphosphine.

Specific examples of the quinone compound include 1,4-benzoquinone, 2,5-toluquinone, 1,4-naphthoquinone, 2,3-dimethylbenzoquinone, 2,6-dimethylbenzoquinone, 2,3-dimethoxy-5-methyl-1,4-benzoquinone, 2,3-dimethoxy-1,4-benzoquinone, and phenyl-1,4-benzoquinone.

Specific examples of the organic boron compound include tetraphenyl borate, tetra-p-tolyl borate and tetra-n-butyl borate.

The amount of the reaction catalyst is not particularly limited. From the viewpoint of reaction rate and storage stability, the amount of the reaction catalyst is preferably from 0.1 parts by mass to 1.5 parts by mass, more preferably from 0.2 parts by mass to 1 part by mass, with respect to 100 parts by mass of the total amount of the mesogenic epoxy monomer and the compound having a functional group that is capable of reacting with an epoxy group of the mesogenic epoxy monomer.

The epoxy resin preferably includes both a specific epoxy compound and a mesogenic epoxy monomer. When a specific epoxy compound and a mesogenic epoxy monomer exist at a suitable proportion in an epoxy resin, a degree of crosslinking density during curing can be increased and a cured product having more suitable thermal resistance can be obtained. The proportion in amount of a specific epoxy compound and a mesogenic epoxy monomer can be adjusted by the amount of a mesogenic epoxy monomer and a compound having a functional group that can react with an epoxy group of the mesogenic epoxy monomer, or other reaction conditions.

The proportion of the mesogenic epoxy monomer in the epoxy resin is preferably 50% or less of the total epoxy resin. It has been found that an epoxy resin, in which the proportion of the mesogenic epoxy monomer is 50% or less, is easier to decrease in viscosity as the temperature is increased and exhibits excellent handleability, as compared with an epoxy resin, in which the proportion of the mesogenic epoxy monomer is greater than 50%. The reason for this is not exactly clear, but it is presumed that an epoxy resin, in which the proportion of the mesogenic epoxy monomer is 50% or less, is less prone to crystal precipitation at a temperature lower than the melting temperature of the epoxy resin.

In the disclosure, the proportion of the mesogenic epoxy monomer in the epoxy resin can be calculated from a chart obtained by liquid chromatography, for example.

Specifically, the proportion of the mesogenic epoxy monomer is regarded as a proportion of the area of a peak derived from the mesogenic epoxy monomer with respect to the area of the total peaks derived from all components in the epoxy resin, which is shown in a chart obtained by liquid chromatography, and is calculated by the following equation. The area of the peaks is determined by detecting an absorbance at a wavelength of 280 nm.

Proportion of area of peak derived from mesogenic epoxy monomer (%)=(area of peak derived from mesogenic epoxy monomer/total area of peaks derived from all components)× 100

The liquid chromatography is performed by using tetrahydrofuran as a mobile phase, at a sample concentration of 0.5% by mass and a flow rate of 1.0 ml/min. The measurement can be performed by using, for example, L6000 from Hitachi, Ltd as a high-speed liquid chromatograph and C-R4A from Shimadzu Corporation as a data analyzer, with GPC columns such as G2000HXL and G3000HXL from Tosoh Corporation.

From the viewpoint of improving the ease of handling, the proportion of the mesogenic epoxy monomer is preferably 50% or less, more preferably 49% or less, further preferably 48% or less, of the total epoxy resin.

From the viewpoint of intrinsic viscosity (melt viscosity), the proportion of the mesogenic epoxy monomer is preferably 35% or more, more preferably 37% or more, further preferably 40% or more, of the total epoxy resin.

The specific epoxy compound can be synthesized by using a reaction container, such as a flask in a small scale or a reaction cauldron in a large scale. A specific example of the synthesis method is described below.

A mesogenic epoxy monomer is placed in a reaction container and a solvent is added as necessary, and the mesogenic epoxy monomer is dissolved by heating the reaction container to a reaction temperature with an oil bath or a heating medium. Then, a compound having a functional group that can react with an epoxy group of the mesogenic epoxy monomer is added thereto. After dissolving the compound in the solvent, a reaction catalyst is added as necessary, thereby starting the reaction. Subsequently, the solvent is removed under reduced pressure as necessary, whereby a specific epoxy compound is obtained.

The reaction temperature is not particularly limited, as long as the reaction of an epoxy group of the mesogenic epoxy monomer and a functional group that can react with an epoxy group can proceed. For example, the reaction temperature is preferably in a range of from 100° C. to 180° C., more preferably from 100° C. to 150° C. When the reaction temperature is 100° C. or higher, the time for completing the reaction tend to be shortened. When the reaction temperature is 180° C. or less, possibility of causing gelation tends to be reduced.

The ratio of the mesogenic epoxy monomer to the compound having a functional group that can react with an epoxy group of the mesogenic epoxy monomer is not particularly limited. For example, the ratio may be adjusted to satisfy a ratio of the number of equivalent of epoxy group (A) to the number of equivalent of the functional group that is capable of reacting with an epoxy group (B), represented by A:B, of from 10:10 to 10:0.01. From the viewpoint of fracture toughness and heat resistance of a cured product, the range of A:B is preferably from 10:5 to 10:0.1.

The structure of the specific epoxy compound can be determined by, for example, matching a molecular weight of the specific epoxy compound, which is presumed to be obtained by the reaction of the mesogenic epoxy monomer and the compound having a functional group that is capable of reacting with an epoxy group of the mesogenic epoxy monomer, with a molecular weight of a target compound obtained by liquid chromatography that is performed by a liquid chromatograph having a UV spectrum detector and a mass spectrum detector.

The liquid chromatography is performed by a gradient method, using a column for analysis (for example, LaChrom II C16 from Hitachi, Ltd.) while continuously changing the mixture ratio (by volume) of the eluent in the order of acetonitrile/tetrahydrofuran/10 mmol/l aqueous ammonium acetate solution=20/5/75, acetonitrile/tetrahydrofuran=80/20 (20 min from the start) and acetonitrile/tetrahydrofuran=50/50 (35 min from the start) at a flow rate of 1.0 ml/min. The UV spectrum detector detects an absorbance at a wavelength of 280 nm and the mass spectrum detector detects an ionization voltage as 2700 V.

The epoxy equivalent amount of the epoxy resin is not particularly limited. From the viewpoint of achieving both fluidity of the epoxy resin and thermal conductivity of a cured product thereof, the epoxy equivalent amount is preferably from 245 g/eq to 360 g/eq, more preferably from 250 g/eq to 355 g/eq, further preferably from 260 g/eq to 350 g/eq.

When the epoxy equivalent amount of the epoxy resin is 245 g/eq or more, crystallinity of the epoxy resin is not too high and the fluidity is less likely to be lowered. When the epoxy equivalent amount of the epoxy resin is 360 g/eq or less, the crosslinking density of the epoxy resin is not too low and a high degree of thermal conductivity of a formed product tends to be achieved. In the disclosure, the epoxy equivalent amount of the epoxy resin is measured by perchloric acid titration.

The epoxy resin preferably includes both a specific epoxy compound and a mesogenic epoxy monomer. When a specific epoxy compound and a mesogenic epoxy monomer exist at a suitable proportion in an epoxy resin, handleability before curing tends to be improved. The proportion of a specific epoxy compound and a mesogenic epoxy monomer can be adjusted by the amount of a mesogenic epoxy monomer and a compound having a functional group that can react with an epoxy group of the mesogenic epoxy monomer, or other reaction conditions.

The epoxy resin according to the disclosure may include an epoxy compound having a different structure from the structure of the specific epoxy compound (except a multimer of the specific epoxy compound), as necessary. In that case, the content of the epoxy compound having a different structure from the structure of the specific epoxy compound is preferably 20% by mass or less, more preferably 10% by mass or less, of the total epoxy resin.

The type of the epoxy compound having a different structure from the structure of the specific epoxy compound is not particularly limited. In particular, a biphenyl epoxy compound and a bisphenol epoxy compound are preferred.

Examples of the biphenyl epoxy compound include an epoxy compound represented by the following Formula (B).

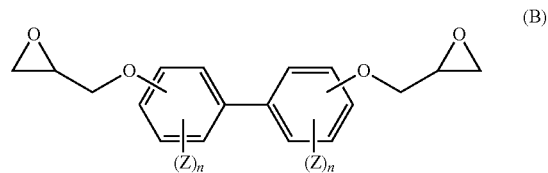

In Formula (B), each Z independently represents an aliphatic hydrocarbon group having 1 to 8 carbon atoms, an alkoxy group having 1 to 8 carbon atoms, a fluorine atom, a chlorine atom, a bromine atom, an iodine atom, a cyano group, a nitro group or an acetyl group; and each n independently represents an integer from 0 to 4.

In Formula (B), each Z is preferably independently an aliphatic hydrocarbon group having 1 to 8 carbon atoms, more preferably a methyl group. Each Z is preferably independently at a meta position with respect to the single bond of the biphenyl structure.

Each n is preferably independently an integer from 1 to 3, more preferably 1 or 2.

Examples of the compound represented by Formula (B) include an epoxy compound represented by the following structure (each R is independently a hydrogen atom or a methyl group).

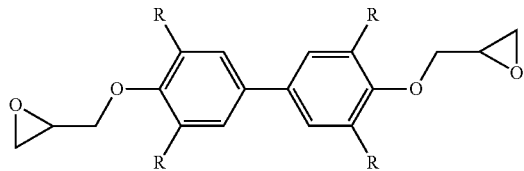

Examples of the bisphenol epoxy compound include a glycidyl ether of a phenol compound such as bisphenol A, bisphenol F and bisphenol S.

Examples of the epoxy compound having a different structure from the structure of the specific epoxy compound include a glycidyl ether of an alcohol compound such as butanediol, polyethylene glycol and polypropylene glycol; a glycidyl ester of a carboxylic acid compound such as phthalic acid, isophthalic acid and tetrahydrophthalic acid; a compound obtained by substituting an active hydrogen bound to a nitrogen atom of aniline, isocyanuric acid and the like; an alicyclic epoxy compound obtained by epoxidizing an olefin bond in the molecule, such as vinylcyclohexene epoxide, 3,4-epoxycyclohexylmethyl-3,4-epoxycyclohexan-ecarboxylate, 2-(3,4-epoxy)cyclohexyl-5,5-spiro(3,4-epoxy)cyclonexane-m-dioxane; an epoxidized compound of bis(4-hydroxy)thioether; a glycidyl ether of a phenol resin that is modified by p-xylylene, m-xylylene and p-xylylene, terpene, dicylclopentadiene, cyclopentadiene, polyaromatic rings and naphthalene; a stilbene epoxy compound, and a halogenated phenol novolac epoxy compound.

The epoxy compound may be used alone or in combination of two or more kinds.

<Epoxy Resin Composition>

The epoxy resin composition according to the disclosure includes an epoxy resin as described above and a curing agent.

(Curing Agent)

The type of the curing agent is not particularly limited, as long as it can cause a curing reaction with an epoxy resin. Specific examples of the curing agent include an amine curing agent, a phenol curing agent, an acid anhydride curing agent, a polymercaptan curing agent, a polyaminoamide curing agent, an isocyanate curing agent, and a block isocyanate curing agent. A single kind of the curing agent may be used alone, or two or more kinds may be used in combination.

From the viewpoint of forming a higher-order structure in a cured product of the epoxy resin composition, a curing agent is preferably an amine curing agent or a phenol curing agent, more preferably an amine curing agent, further preferably an amine compound having at least two amino groups that are directly bonded to an aromatic ring.

Specific examples of the amine curing agent include 3,3'-diaminodiphenylsulfone, 4,4'-diaminodiphenylsulfone, 4,4'-diaminodiphenylmethane, 4,4'-diaminodiphenylether, 4,4'-diamino-3,3'-dimethoxybiphenyl, 4,4'-diaminophenylbenzoate, 1,5-diaminonaphthalene, 1,3-diaminonaphthalene, 1,4-diaminonaphthalene, 1,8-diaminonaphthalene, 1,3-diaminobenzene, 1,4-diaminobenzene, 4,4'-diaminobenzanilide, and trimethylene-bis-4-aminobenzoate.

From the viewpoint of forming a smectic structure in a cured product of the epoxy resin composition, the curing agent is preferably 3,3'-diaminodiphenylsulfone, 4,4'-diaminodiphenylsulfone, 1,3-diaminobenzene, 1,4-diaminobenzene, 4,4'-diaminobenzanilide, 1,5-diaminonaphthalene, 4,4'-diaminodiphenylmethane or trimethylene-bis-4-aminobenzoate. From the viewpoint of obtaining a cured product with low water absorption and high fracture toughness, the curing agent is more preferably 3,3'-diaminodiphenylsulfone.

Examples of the phenol curing agent include a low-molecular phenol compound and a phenol novolac resin, which is obtained by linking low-molecular phenol compounds with a methylene group or the like. Examples of the low-molecular phenol compound include a monofunctional phenol compound, such as phenol, o-cresol, m-cresol and p-cresol; a difunctional phenol compound, such as catechol, resorcinol and hydroquinone; and a trifunctional phenol compound such as 1,2,3-trihydroxybenzene, 1,2,4-trihydroxybenzene and 1,3,5-trihydroxybenzene.

The amount of the curing agent in the epoxy resin composition is not particularly limited. From the viewpoint of efficiency of curing reaction, the amount of the curing agent preferably satisfies a ratio of number of equivalent of the functional group of the curing agent in the epoxy resin composition with respect to the number of equivalent of the epoxy group of the epoxy resin (number of equivalent of functional group/number of equivalent of epoxy group) of from 0.3 to 3.0, more preferably from 0.5 to 2.0.

(Other Components)

The epoxy resin composition may include components other than the epoxy resin and the curing agent. For example, the epoxy resin composition may include a curing catalyst, a filler or the like. Specific examples of the curing catalyst include the compounds as described above as a reaction catalyst used for the synthesis of a multimer of the epoxy compound.

(Use Application)

The use application of the epoxy resin composition is not particularly limited. For example, the epoxy resin composition can be suitably used for a processing method that requires low viscosity and excellent fluidity. For example, the epoxy resin composition may be used for a process of producing FRPs (fiber-reinforced plastics), in which fibers are impregnated with an epoxy resin composition while heating, or a process of producing a sheet-like product in which an epoxy resin composition is spread with a squeegee or the like while heating.

Since the resin sheet produced from the epoxy resin composition exhibits excellent adhesion, the epoxy resin composition is suitably used for production of a laminate in which plural resin sheets are integrated (e.g., layered). In that case, the resin sheets preferably include an epoxy resin of the same kind. Resin sheets including an epoxy resin of the same kind are highly compatible with each other, and tend to achieve tight adhesion.

The epoxy resin composition is also suitably used for a method in which a solvent is desirably not added or reduced in order to suppress formation of voids in a cured product (e.g., production of FRPs used for aeroplanes or spaceships).

<Epoxy Resin Composition Cured Product and Composite Material>

The epoxy resin cured product according to the disclosure is obtained by curing the epoxy resin composition as described above. The composite material according to the disclosure includes the epoxy resin cured product and a reinforcing material.

Specific examples of the reinforcing material include a carbon material, glass, aromatic polyamide resins such as Kevlar (registered trade name), ultra high molecular weight polyethylene, alumina, boron nitride, aluminum nitride, mica and silicon. The form of the reinforcing material is not particularly limited, and examples thereof include fibers and particles (filler). From the viewpoint of improving the strength, the reinforcing material is preferably a carbon material, more preferably carbon fibers. The composite material may include a single kind of reinforcing material, or may include two or more kinds in combination.

Since the epoxy resin composition exhibits excellent adhesion, the epoxy resin composition is suitably used for the purpose of integrating (e.g., laminating) plural composite materials. In that case, the composite materials preferably include an epoxy resin of the same kind. Composite materials including an epoxy resin of the same kind are highly compatible with each other, and tend to achieve tight adhesion.

EXAMPLES

In the following, the invention is explained by referring to the Examples. However, the invention is not limited to these Examples.

Example 1

To a 500-mL three-necked flask, 50 parts by mass of a mesogenic epoxy monomer having a structure described below were placed, and 100 parts by mass of propyleneglycol monomethyl ether were added. A cooling tube and a nitrogen inlet tube were attached to the flask, and a stirring blade was attached so as to be immersed in the solvent. Then, the flask was immersed in an oil bath at 120° C. and subjected to stirring.

After confirming that the mesogenic epoxy monomer was dissolved and the solution became clear, 4,4'-dihydroxybiphenyl was added as a specific aromatic compound, such that the ratio of the equivalent amount of epoxy group of the mesogenic epoxy monomer (A) to the equivalent amount of hydroxy group of 4,4'-dihydroxybiphenyl (B) (A:B) was 10:2.5, and 0.5 g of triphenylphosphine were added as a reaction catalyst. The heating of the mixture was continued in an oil bath at 120° C. for 3 hours. Thereafter, propyleneglycol monomethyl ether was evaporated under reduced pressure, and the residue was cooled to room temperature (25° C.). An epoxy resin, in which a part of the mesogenic epoxy monomer is reacted with 4,4'-dihydroxybiphenyl to form a multimer (specific epoxy compound), was thus obtained.

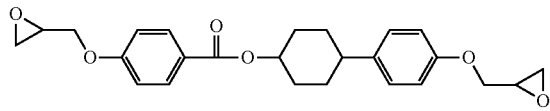 [SMILES: O=C(OC1CCC(c2ccc(OCC3CO3)cc2)CC1)c1ccc(OCC2CO2)cc1]

It was confirmed that the epoxy resin included an epoxy compound having two mesogenic structures derived from the mesogenic epoxy monomer and a divalent aromatic group derived from 4,4'-dihydroxybiphenyl (dimer compound) by liquid chromatography.

Subsequently, 50 g of the epoxy resin and 9.4 g of 3,3'-diaminodiphenylsulfone as a curing agent were placed in a stainless dish, and heated on a hot plate at 180° C. After the resin in the stainless dish was melted, the resin was mixed with a spatula to prepare an epoxy resin composition. After taking some of the epoxy resin composition for evaluating the interlayer adhesion (approximately 5 g), the remainder was heated at 180° C. for 1 hour. After cooling to room temperature (25° C.), the resin was taken out from the stainless dish and heated in a thermostat chamber at 230° C. for 1 hour to complete the curing, thereby obtaining an epoxy resin cured product. A sample for evaluating the fracture toughness having a size of 3.75 mm×7.5 mm×33 mm was prepared from the epoxy resin cured product.

Example 2

To a 500-mL three-necked flask, 50 parts by mass of a mesogenic epoxy monomer having a structure described below were placed, and 100 parts by mass of propyleneglycol monomethyl ether were added. A cooling tube and a nitrogen inlet tube were attached to the flask, and a stirring blade was attached so as to be immersed in the solvent. Then, the flask was immersed in an oil bath at 120° C. and subjected to stirring.

After confirming that the mesogenic epoxy monomer was dissolved and the solution became clear, 2,2'-dihydroxybiphenyl was added as a specific aromatic compound, such that the ratio of the equivalent amount of epoxy group of the mesogenic epoxy monomer (A) to the equivalent amount of hydroxy group of 2,2'-dihydroxybiphenyl (B) (A:B) was 10:2.5, and 0.5 g of triphenylphosphine were added as a reaction catalyst. The heating of the mixture was continued in an oil bath at 120° C. for 3 hours. Thereafter, propyleneglycol monomethyl ether was evaporated under reduced pressure, and the residue was cooled to room temperature (25° C.). An epoxy resin, in which a part of the mesogenic epoxy monomer is reacted with 2,2'-dihydroxybiphenyl to form a multimer (specific epoxy compound), was thus obtained.

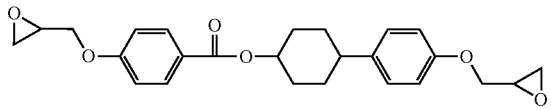

It was confirmed that the epoxy resin included an epoxy compound having two mesogenic structures derived from the mesogenic epoxy monomer and a divalent aromatic group derived from 2,2'-dihydroxybiphenyl (dimer compound) by liquid chromatography.

Subsequently, 50 g of the epoxy resin and 9.4 g of 3,3'-diaminodiphenylsulfone as a curing agent were placed in a stainless dish, and heated on a hot plate at 180° C. After the resin in the stainless dish was melted, the resin was mixed with a spatula to prepare an epoxy resin composition. After taking some of the epoxy resin composition for evaluating the interlayer adhesion (approximately 5 g), the remainder was heated at 180° C. for 1 hour. After cooling to room temperature (25° C.), the resin was taken out from the stainless dish and heated in a thermostat chamber at 230° C. for 1 hour to complete the curing, thereby obtaining an epoxy resin cured product. A sample for evaluating the fracture toughness having a size of 3.75 mm×7.5 mm×33 mm was prepared from the epoxy resin cured product.

Example 3

To a 500-mL three-necked flask, 50 parts by mass of a mesogenic epoxy monomer having a structure described below were placed, and 100 parts by mass of propyleneglycol monomethyl ether were added. A cooling tube and a nitrogen inlet tube were attached to the flask, and a stirring blade was attached so as to be immersed in the solvent. Then, the flask was immersed in an oil bath at 120° C. and subjected to stirring.

After confirming that the mesogenic epoxy monomer was dissolved and the solution became clear, hydroquinone was added as a specific aromatic compound, such that the ratio of the equivalent amount of epoxy group of the mesogenic epoxy monomer (A) to the equivalent amount of hydroxy group of hydroquinone (B) (A:B) was 10:2.5, and 0.5 g of triphenylphosphine were added as a reaction catalyst. The heating of the mixture was continued in an oil bath at 120° C. for 3 hours. Thereafter, propyleneglycol monomethyl ether was evaporated under reduced pressure, and the residue was cooled to room temperature (25° C.). An epoxy resin, in which a part of the mesogenic epoxy monomer is reacted with hydroquinone to form a multimer (specific epoxy compound), was thus obtained.

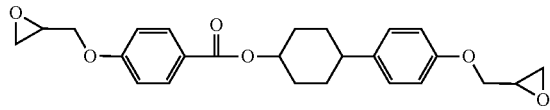 [SMILES: O=C(OC1CCC(c2ccc(OCC3CO3)cc2)CC1)c1ccc(OCC2CO2)cc1]

It was confirmed that the epoxy resin included an epoxy compound having two mesogenic structures derived from the mesogenic epoxy monomer and a divalent aromatic group derived from hydroquinone (dimer) by liquid chromatography.

Subsequently, 50 g of the epoxy resin and 5.0 g of an epoxy compound represented by the following structure (tetramethyl biphenol epoxy resin) and 11.4 g of 3,3'-diaminodiphenylsulfone as a curing agent were placed in a stainless dish, and heated on a hot plate at 180° C. After the resin in the stainless dish was melted, the resin was mixed with a spatula to prepare an epoxy resin composition. After taking some of the epoxy resin composition for evaluating the interlayer adhesion (approximately 5 g), the remainder was heated at 180° C. for 1 hour. After cooling to room temperature (25° C.), the resin was taken out from the stainless dish and heated in a thermostat chamber at 230° C. for 1 hour to complete the curing, thereby obtaining an epoxy resin cured product. A sample for evaluating the fracture toughness having a size of 3.75 mm×7.5 mm×33 mm was prepared from the epoxy resin cured product.

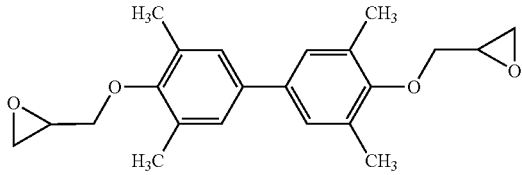 [SMILES: Cc1cc(-c2cc(C)c(OCC3CO3)c(C)c2)cc(C)c1OCC1CO1]

Example 4

To a 500-mL three-necked flask, 50 parts by mass of a mesogenic epoxy monomer having a structure described below were placed, and 100 parts by mass of propyleneglycol monomethyl ether were added. A cooling tube and a nitrogen inlet tube were attached to the flask, and a stirring blade was attached so as to be immersed in the solvent. Then, the flask was immersed in an oil bath at 120° C. and subjected to stirring.

After confirming that the mesogenic epoxy monomer was dissolved and the solution became clear, 4,4'-dihydroxybiphenyl was added as a specific aromatic compound, such that the ratio of the equivalent amount of epoxy group of the mesogenic epoxy monomer (A) to the equivalent amount of hydroxy group of 4,4'-dihydroxybiphenyl (B) (A:B) was 10:0.5, and 0.5 g of triphenylphosphine were added as a reaction catalyst. The heating of the mixture was continued in an oil bath at 120° C. for 3 hours. Thereafter, propyleneglycol monomethyl ether was evaporated under reduced pressure, and the residue was cooled to room temperature (25° C.). An epoxy resin, in which a part of the mesogenic epoxy monomer is reacted with 4,4'-dihydroxybiphenyl to form a multimer (specific epoxy compound), was thus obtained.

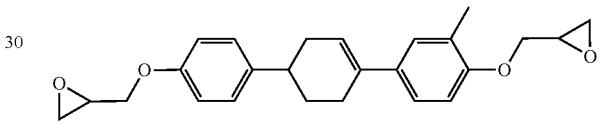

It was confirmed that the epoxy resin included an epoxy compound having two mesogenic structures derived from the mesogenic epoxy monomer and a divalent aromatic group derived from 4,4'-dihydroxybiphenyl (dimer compound) by liquid chromatography.

Subsequently, 50 g of the epoxy resin and 12.9 g of 3,3'-diaminodiphenylsulfone as a curing agent were placed in a stainless dish, and heated on a hot plate at 180° C. After the resin in the stainless dish was melted, the resin was mixed with a spatula to prepare an epoxy resin composition. After taking some of the epoxy resin composition for evaluating the interlayer adhesion (approximately 5 g), the remainder was heated at 180° C. for 1 hour. After cooling to room temperature (25° C.), the resin was taken out from the stainless dish and heated in a thermostat chamber at 230° C. for 1 hour to complete the curing, thereby obtaining an epoxy resin cured product. A sample for evaluating the fracture toughness having a size of 3.75 mm×7.5 mm×33 mm was prepared from the epoxy resin cured product.

Comparative Example 1

An epoxy resin was prepared in a similar manner to Example 1, except that hydroquinone was used instead of 4,4'-dihydroxybiphenyl such that the ratio of the equivalent amount of epoxy group of the mesogenic epoxy monomer (A) to the equivalent amount of hydroxy group of hydroquinone (B) (A:B) was 10:1.0.

It was confirmed that the epoxy resin included an epoxy compound having two mesogenic structures derived from the mesogenic epoxy monomer and a divalent aromatic group derived from hydroquinone (dimer compound) by liquid chromatography.

Subsequently, 50 g of the epoxy resin and 12.1 g of 3,3'-diaminodiphenylsulfone as a curing agent were placed in a stainless dish, and an epoxy resin composition and an epoxy resin cured product were prepared in a similar manner to Example 1. Samples were prepared from the epoxy resin cured product in a similar manner to Example 1.

Comparative Example 2

An epoxy resin was prepared in a similar manner to Example 1, except that resorcinol was used instead of 4,4'-dihydroxybiphenyl such that the ratio of the equivalent amount of epoxy group of the mesogenic epoxy monomer (A) to the equivalent amount of hydroxy group of resorcinol (B) (A:B) was 10:2.0.

It was confirmed that the epoxy resin included an epoxy compound having two mesogenic structures derived from the mesogenic epoxy monomer and a divalent aromatic group derived from resorcinol (dimer compound) by liquid chromatography.

Subsequently, 50 g of the epoxy resin and 10.57 g of 3,3'-diaminodiphenylsulfone as a curing agent were placed in a stainless dish, and an epoxy resin composition and an epoxy resin cured product were prepared in a similar manner to Example 1. Samples were prepared from the epoxy resin cured product in a similar manner to Example 1.

Comparative Example 3

An epoxy resin was prepared in a similar manner to Example 1, except that resorcinol was used instead of 4,4'-dihydroxybiphenyl such that the ratio of the equivalent amount of epoxy group of the mesogenic epoxy monomer (A) to the equivalent amount of hydroxy group of resorcinol (B) (A:B) was 10:3.0.

It was confirmed that the epoxy resin included an epoxy compound having two mesogenic structures derived from the mesogenic epoxy monomer and a divalent aromatic group derived from resorcinol (dimer compound) by liquid chromatography.

Subsequently, 50 g of the epoxy resin and 9.0 g of 3,3'-diaminodiphenylsulfone as a curing agent were placed in a stainless dish, and an epoxy resin composition and an epoxy resin cured product were prepared in a similar manner to Example 1. Samples were prepared from the epoxy resin cured product in a similar manner to Example 1.

Comparative Example 4

An epoxy resin was prepared in a similar manner to Comparative Example 2, except that hydroquinone was used instead of resorcinol such that the ratio of the equivalent amount of epoxy group of the mesogenic epoxy monomer (A) to the equivalent amount of hydroxy group of hydroquinone (B) (A:B) was 10:2.0.

It was confirmed that the epoxy resin included an epoxy compound having two mesogenic structures derived from the mesogenic epoxy monomer and a divalent aromatic group derived from hydroquinone (dimer compound) by liquid chromatography.

Subsequently, 50 g of the epoxy resin and 10.57 g of 3,3'-diaminodiphenylsulfone as a curing agent were placed in a stainless dish, and an epoxy resin composition and an epoxy resin cured product were prepared in a similar manner to Example 1. Samples were prepared from the epoxy resin cured product in a similar manner to Example 1.

Comparative Example 5

An epoxy resin was prepared in a similar manner to Comparative Example 3, except that hydroquinone was used instead of resorcinol such that the ratio of the equivalent amount of epoxy group of the mesogenic epoxy monomer (A) to the equivalent amount of hydroxy group of hydroquinone (B) (A:B) was 10:3.0.

It was confirmed that the epoxy resin included an epoxy compound having two mesogenic structures derived from the mesogenic epoxy monomer and a divalent aromatic group derived from hydroquinone (dimer compound) by liquid chromatography.

Subsequently, 50 g of the epoxy resin and 9.0 g of 3,3'-diaminodiphenylsulfone as a curing agent were placed in a stainless dish, and an epoxy resin composition and an epoxy resin cured product were prepared in a similar manner to Example 1. Samples were prepared from the epoxy resin cured product in a similar manner to Example 1.

<Measurement of Loss Tangent>

The loss tangent at 35° C. of the epoxy resin was measured with a rheometer (MCR-301, Anton-Paar GbmH) in an oscillation mode. The measurement was performed by using parallel plate with a diameter of 12 mm, under the conditions of frequency: 1 Hz, gap: 0.2 mm, distortion: 2%.

The measurement was performed by conducting a process of melting the epoxy resin at 150° C. for 3 minutes, a process of decreasing the temperature of the epoxy resin from 150° C. to 30 at a rate of 2° C./minute, and a process of increasing the temperature of the epoxy resin from 30° C. to 150° C. at a rate of 2° C./minute, in this order. In the process of increasing the temperature, the loss tangent at 35° C. of the epoxy resin was measured. The results are shown in Table 1.

<Evaluation of Interlayer Adhesion>

The adhesion between the sheets prepared from the epoxy resin composition was evaluated by the following method.

A stainless plate was sufficiently heated on a hot plate at 150° C., and a PET film was placed on the stainless plate and fixed. Subsequently, several grams of the epoxy resin composition were placed on the PET film and melted. The temperature of the hot plate was lowered to 100° C., and retained at 100° C. for 5 minutes. The epoxy resin composition was spread over the PET film using an applicator that had been heated to 100° C., with a gap of 100 μm, thereby preparing a resin sheet.

The sheet was cut into two pieces with a size of 2 cm×6 cm, respectively, and the pieces were attached to each other so as to overlap at an area of 2 cm×4 cm, on a hot plate at 50° C. by hand press. Thereafter, a weight (200 g) was attached at the lower edge of one of the pieces, and the state of the pieces while applying shear load for 1 minute was evaluated by the following criteria. The results are shown in Table 1.

A: the pieces are favorably attached even after 1 minute.
B: the pieces are initially favorably attached, but cause shear separation within 1 minute.
C: the pieces are initially favorably attached, but cause shear separation by application of shear load.
D: the pieces do not attach to each other.

<Evaluation of Toughness>

As an index for the toughness of the epoxy resin cured product, a three-point bending test according to ASTM D5045 was performed using Instron 5948 (Instron), and the fracture toughness (MPa·m$^{1/2}$) was calculated from the result of the test. The results are shown in Table 1.

<Existence or Non-Existence of Smectic Structure>

In order to determine whether or not a smectic structure was formed in the epoxy resin cured product, an X-ray diffraction measurement was performed using CuKα 1 line, under a tube voltage of 50 kV, a tube current of 300 mA, a scan rate of 1°/min and a measurement range 2θ=2° to 30° using an X-ray diffractometer (Rigaku Corporation).

When a diffraction peak is observed in a range of 2θ=2° to 10°, it was determined that a smectic structure is formed in the epoxy resin cured product (YES) and when a diffraction peak is not observed in a range of 2θ=2° to 10°, it was determined that a smectic structure is no formed in the epoxy resin cured product (NO).

TABLE 1

| | Epoxy resin Loss tangent at 35° C. | Epoxy resin composition Interlayer adhesion | Epoxy resin cured product Fracture toughness (MPa · m$^{1/2}$) | Smectic structure |
|---|---|---|---|---|
| Example 1 | 5.1 | A | 2.1 | YES |
| Example 2 | 1.6 | C | 1.8 | YES |
| Example 3 | 12.7 | A | 1.6 | YES |
| Example 4 | 2.1 | B | 1.6 | YES |
| Comparative Example 1 | 0.2 | D | 1.5 | YES |
| Comparative Example 2 | 0.7 | D | 1.5 | YES |
| Comparative Example 3 | 0.8 | D | 1.6 | YES |
| Comparative Example 4 | 0.6 | D | 1.5 | YES |
| Comparative Example 5 | 0.8 | D | 1.4 | YES |

As shown in Table 1, the sheet prepared from the epoxy resin composition of the Examples, which includes an epoxy resin having a loss tangent of 1 or more at 35° C. before curing, exhibits a favorable interlayer adhesion as compared with the epoxy resin composition of the Comparative Examples, which includes an epoxy resin having a loss tangent of less than 1 at 35° C. before curing. Further, the epoxy resin cured product of the Examples includes a smectic structure and exhibits favorable fracture toughness.

The disclosure of Japanese Patent Application No. 2018-026891 is herein incorporated by reference.

All publications, patent applications, and technical standards mentioned in this specification are herein incorporated by reference to the same extent as if each individual publication, patent application, or technical standard was specifically and individually indicated to be incorporated by reference.

The invention claimed is:

1. An epoxy resin, comprising an epoxy compound having two or more mesogenic structures, and having a loss tangent of 1 or more at 35° C. before curing,
wherein the epoxy compound has a structure represented by the following Formula (1-B):

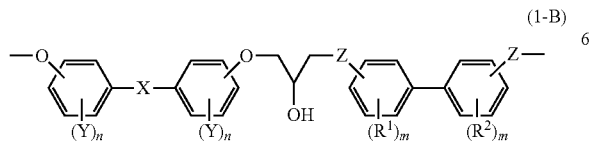

(1-B)

wherein, in Formula (1-B), each of R$^1$ and R$^2$ independently represents an alkyl group having 1 to 8 carbon atoms; X represents a single bond or a linking group that includes at least one divalent group selected from the following Group (A); each Y independently represents an aliphatic hydrocarbon group having 1 to 8 carbon atoms, an alkoxy group having 1 to 8 carbon atoms, a fluorine atom, a chlorine atom, a bromine atom, an iodine atom, a cyano group, a nitro group or an acetyl group; each Z independently represents —O— or —NH—; each m independently represents an integer from 0 to 4; and each n independently represents an integer from 0 to 4:

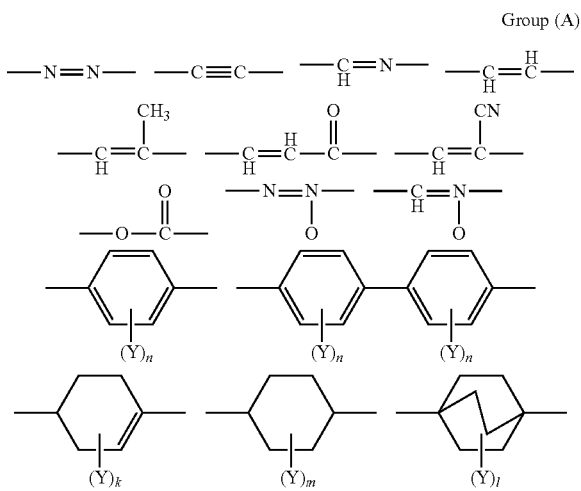

Group (A)

wherein, in Group (A), each Y independently represents an aliphatic hydrocarbon group having 1 to 8 carbon atoms, an alkoxy group having 1 to 8 carbon atoms, a fluorine atom, a chlorine atom, a bromine atom, an iodine atom, a cyano group, a nitro group or an acetyl group; k represents an integer from 0 to 7; l represents an integer from 0 to 12; m represents an integer from 0 to 8; and each n independently represents an integer from 0 to 4.

2. The epoxy resin according to claim 1, wherein the epoxy compound has a structure represented by the following Formula (2-B);

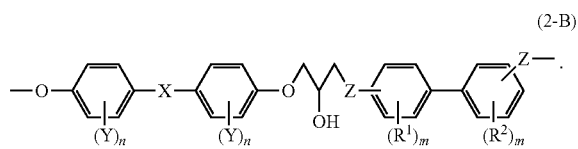
(2-B)

3. The epoxy resin according to claim 1, wherein at least one of the two or more mesogenic structures has a structure represented by at least one of Formula (3) or Formula (4):

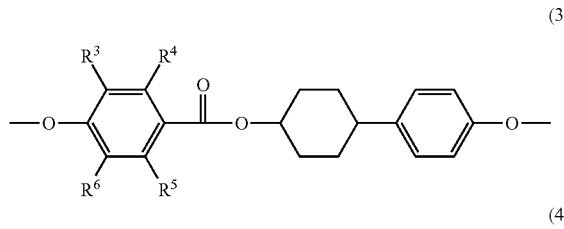
(3)

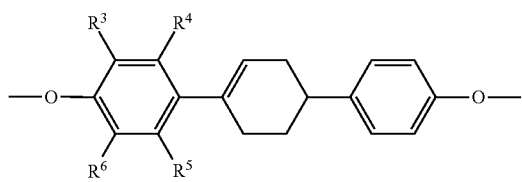
(4)

wherein, in Formula (3) and Formula (4), each of $R^3$ to $R^6$ independently represents a hydrogen atom or an alkyl group having 1 to 3 carbon atoms.

4. The epoxy resin according to claim 1, wherein the epoxy compound has two mesogenic structures and a divalent biphenyl group that is disposed between the two mesogenic structures.

5. The epoxy resin according to claim 1, further comprising a mesogenic epoxy monomer represented by the following Formula (1-m):

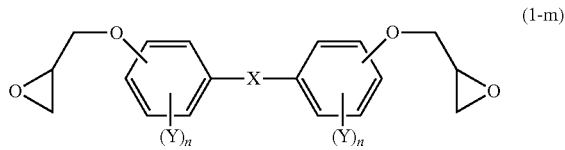
(1-m)

wherein, in Formula (1-m), X represents a single bond or a linking group that includes at least one divalent group selected from the following Group (A); each Y independently represents an aliphatic hydrocarbon group having 1 to 8 carbon atoms, an alkoxy group having 1 to 8 carbon atoms, a fluorine atom, a chlorine atom, a bromine atom, an iodine atom, a cyano group, a nitro group or an acetyl group; and each n independently represents an integer from 0 to 4:

Group (A)

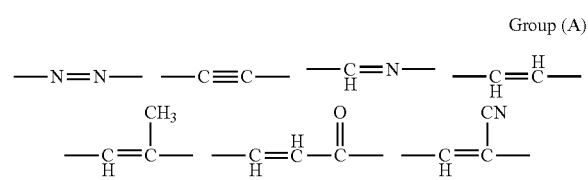

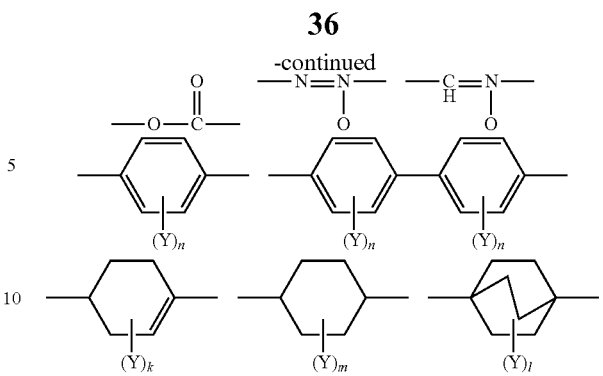

wherein, in Group (A), each Y independently represents an aliphatic hydrocarbon group having 1 to 8 carbon atoms, an alkoxy group having 1 to 8 carbon atoms, a fluorine atom, a chlorine atom, a bromine atom, an iodine atom, a cyano group, a nitro group or an acetyl group; k represents an integer from 0 to 7; l represents an integer from 0 to 12; m represents an integer from 0 to 8; and each n independently represents an integer from 0 to 4.

6. The epoxy resin according to claim 5, wherein the mesogenic epoxy monomer comprises an epoxy compound represented by the following Formula (2-m):

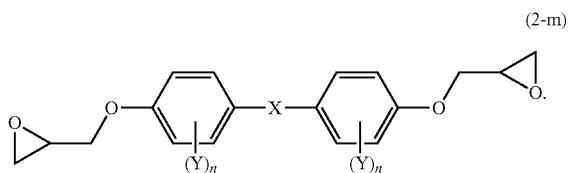
(2-m)

7. The epoxy resin according to claim 5, wherein the mesogenic epoxy monomer comprises an epoxy compound represented by the following Formula (3-m) or Formula (4-m):

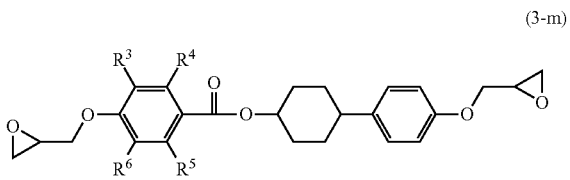
(3-m)

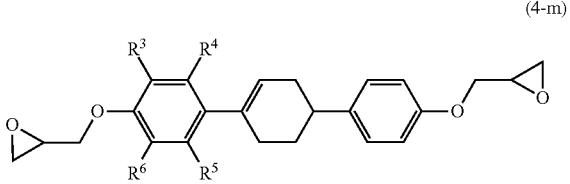
(4-m)

wherein, in Formula (3-m) and Formula (4-m), each of $R^3$ to $R^6$ independently represents a hydrogen atom or an alkyl group having 1 to 3 carbon atoms.

8. The epoxy resin according to claim 5, wherein a mass concentration, obtained by liquid chromatography, of the mesogenic epoxy monomer is not greater than 50% of the total mass concentration of the epoxy resin.

9. An epoxy resin composition, comprising the epoxy resin according to claim 1 and a curing agent.

10. The epoxy resin composition according to claim 9, wherein the curing agent comprises a compound having two or more amino groups that are directly bonded to an aromatic ring.

11. The epoxy resin composition according to claim 9, wherein the curing agent comprises 3,3'-diaminodiphenylsulfone.

12. An epoxy resin cured product, which is obtained by curing the epoxy resin composition according to claim 9.

13. A composite material, comprising the epoxy resin cured product according to claim 12 and a reinforcing material.

14. The composite material according to claim 13, wherein the reinforcing material comprises a carbon material.

* * * * *